UNITED STATES PATENT OFFICE.

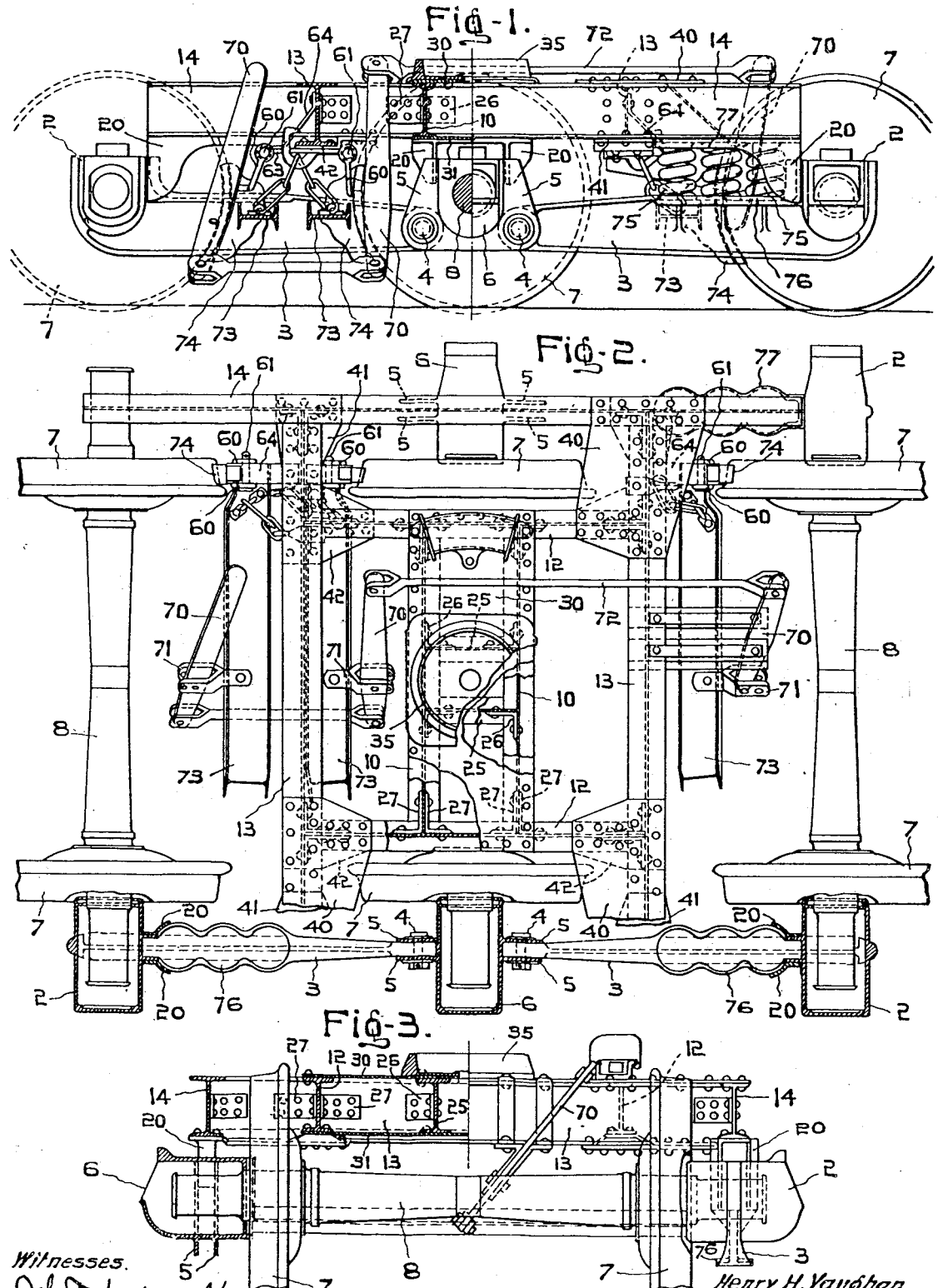

HENRY H. VAUGHAN, OF WESTMOUNT, QUEBEC, CANADA.

RAILWAY-CAR TRUCK.

1,120,173.  Specification of Letters Patent.  Patented Dec. 8, 1914.

Application filed January 17, 1914. Serial No. 812,732.

*To all whom it may concern:*

Be it known that I, HENRY H. VAUGHAN, of the city of Westmount, in the Province of Quebec, Dominion of Canada, a citizen of the United States of America, have invented certain new and useful Improvements in Railway-Car Trucks; and I do hereby declare that the following is a full, clear, and exact description thereof.

This invention has been designed for use more particularly in freight cars, although its essentials may be adapted for use in the construction of other classes of cars.

Heretofore modern railway car trucks of the six wheel type have usually had a truck-frame, a spring plank, a bolster, equalizer bars, axle-boxes movable in guides in the truck frame and two sets of springs, one set of springs (usually of elliptical form) on the equalizer bars and supporting the truck frame and the other set of springs resting on the spring-plank and carrying the bolster. In these trucks as heretofore used the truck frame is interposed between the equalizer bar and bolster.

The object of the present invention is to provide a six-wheel truck of simple construction and minimum weight and one comprising fewer disconnected parts than the six-wheel steel truck heretofore in use.

To this end the invention consists in providing a six-wheel steel truck comprising a rigid truck-frame member with a bolster forming an integral part thereof, a pair of compensating members each consisting of united parts; and springs interposed between the compensating members and truck-frame member. For full comprehension, however, of my invention reference must be had to the accompanying drawings forming a part of this specification, in which similar reference characters indicate the same parts, and wherein:

Figure 1 is a side elevation partly in vertical sectional view, of my improved truck; Fig. 2 is a plan view partly in horizontal sectional view; and Fig. 3 is an end elevation partly in vertical sectional view.

The compensating member of my improved truck comprises a pair of end axle boxes 2 having cast in one piece therewith or otherwise rigidly united thereto a pair of compensating arms 3 pivoted by means of pins 4 to lugs 5 cast on opposite sides of the middle axle box 6. Spring seats 76 are formed integrally with the arms 3 near the end axle boxes 2. The wheels 7 are as usual mounted rigidly on the axles 8.

The truck frame comprises a bolster supported at its ends by auxiliary sills 12 from transoms 13 supported in turn by side-sill members 14, these truck-frame members being rigidly connected together. The ends and middle of the side-sill members are provided with downwardly extending lugs 20 of angular cross-section adapted to straddle and closely and slidably fit the sides of the compensating arms between the end spring seats and the axle boxes and clasp the contiguous portion of such spring seats. These lugs effect a vertically sliding connection between the truck frame and axle boxes, and they are formed by castings riveted to the sills. The detail construction of these truck-frame parts is as follows:—The bolster consists of a pair of I-beams 10 relatively braced by spaced transverse I-beams 25 located at opposite sides of the centers of the bolster and secured in place by angle-brackets 26; the ends of the I-beams 10 being secured to the auxiliary side sills 12 by angle-brackets 27. Top and bottom gusset plates 30 and 31 are riveted to the auxiliary side-sills and the I-beams 10; and the usual center plate 35 is secured on the top plate. Top and bottom gusset plates 40, 41 and 42 respectively of irregular form stiffen the joint between the auxiliary sills and transoms and the transoms and main sills, the plates 41 and 42 being located on the underside of the frame and so constructed as to provide necessary clearance for brake-hangers 60. The stiffening of this frame is further secured by the connection of the top and bottom bolster plates 30 and 31 to the auxiliary side sills. The hangers consist of stirrups hung from pins 61 carried in the ends of brackets consisting of horizontal plates 63 riveted at one end to the underside of the transoms and supported at their other ends by diagonal plates 64 riveted thereto and to the web of the transoms. Brake levers indicated at 70 are fulcrumed in brackets 71, the rods being indicated at 72 and the brake beams at 73, the latter carrying usual brake-shoes 74. This construction provides a six-wheel steel truck comprising a rigid truck frame member with a bolster forming an integral part thereof the lugs 20 forming a connection therebetween and the pair of compensating members constituted by the arms 3 and axle-boxes 2 and 6, and sufficient cushioning effect between this truck-frame member and compensating members is secured by sets of coiled springs 75 bearing between the spring seats 76 and 77 respectively upon the top of the compensating members and the underside of the frame.

What I claim is as follows:—

1. In a six wheel steel truck for railway cars a truck frame consisting of side sills having spring seats on the undersides of their end portions, transoms rigidly secured to the side sills at points inward of and adjacent to the spring seats, auxiliary side sills spaced from the main side sills and rigidly secured to the transoms, and a bolster rigidly secured at its ends to the auxiliary side sills.

2. In a six wheel steel truck for railway cars a truck frame consisting of side sills having spring seats on the undersides of their end portions, transoms rigidly secured to the side sills at points inward of and adjacent to the spring seats; auxiliary side sills spaced from the main side sills and rigidly secured to the transoms; a bolster rigidly secured at its ends to the auxiliary side sills; top gusset plates extending over and rigidly secured to the abutting and abutted portions of the side sills, transoms and auxiliary side sills, and bottom gusset plates secured to the underside of the frame in substantial juxtaposition with the top gusset plates and constructed to provide clearances.

3. In a six wheel steel truck for railway cars a truck frame consisting of side sills having spring seats on the undersides of their end portions, transoms rigidly secured to the side sills at points inward of and adjacent to the spring seats; auxiliary side sills spaced from the main side sills and rigidly secured to the transoms; a bolster rigidly secured at its ends to the auxiliary side sills; the said bolster consisting of spaced I-beams and top and bottom gusset plates extending completely over and rigidly secured to the I-beams and the portions of the auxiliary side sills abutted thereby, top gusset plates extending over and rigidly secured to sills spaced from the main side sills and rigidly secured to the transoms; a bolster rigidly secured at its ends to the auxiliary side sills, the said bolster consisting of I-beams and top and bottom gusset plates extending completely over and rigidly secured having spring seats on the undersides of their end portions, transoms rigidly secured to the side sills at points inward of and adjacent to the spring seats; auxiliary side 4. In a six wheel steel truck for railway cars a truck frame consisting of side sills secured to the I-beams and the portions of the auxiliary side sills abutted thereby, the abutting and abutted portions of the side sills, transoms and auxiliary side sills, and bottom gusset plates secured to the underside of the frame in substantial juxtaposition with the top gusset plates and constructed to provide clearances.

5. In a six wheel steel truck for railway cars comprising in combination a rigid truck frame member with a bolster forming an integral part thereof and having spring seats at the underside of its extreme corner portions, a pair of compensating members each consisting of a middle and two end axle-boxes and arms rigidly connected to the end axle-boxes and pivotally connected to the middle axle-boxes such arms having spring seats in vertical alinement with the spring seats upon the truck frame, springs interposed between the spring seats, and the truck frame having downwardly extending lugs vertically slidably engaging the said arms.

In testimony whereof I have signed my name to this specification in the presence of two witnesses.

HENRY H. VAUGHAN.

Witnesses:
  E. R. PITTS,
  WILLIAM J. C. HEWETSON.